United States Patent
Nallampatti Ekambaram et al.

(10) Patent No.: US 11,943,022 B2
(45) Date of Patent: Mar. 26, 2024

(54) TECHNIQUES FOR ELEVATED DEVICE COMMUNICATION

(71) Applicant: Intel Corporation, Santa Clara, CA (US)

(72) Inventors: Venkatesan Nallampatti Ekambaram, San Diego, CA (US); Yang-Seok Choi, Portland, OR (US); Junyoung Nam, Sunnyvale, CA (US); Feng Xue, Redwood City, CA (US); Shu-ping Yeh, Campbell, CA (US); Hosein Nikopour, San Jose, CA (US); Shilpa Talwar, Cupertino, CA (US); Jan Schreck, San Jose, CA (US); Nageen Himayat, Fremont, CA (US); Sagar Dhakal, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 17/435,587

(22) PCT Filed: Mar. 29, 2019

(86) PCT No.: PCT/US2019/024957
§ 371 (c)(1),
(2) Date: Sep. 1, 2021

(87) PCT Pub. No.: WO2020/204887
PCT Pub. Date: Oct. 8, 2020

(65) Prior Publication Data
US 2022/0158702 A1     May 19, 2022

(51) Int. Cl.
*H04W 16/28* (2009.01)
*H04B 7/06* (2006.01)
(Continued)

(52) U.S. Cl.
CPC ......... *H04B 7/0617* (2013.01); *H04B 7/086* (2013.01); *H04W 16/28* (2013.01); *H04W 24/10* (2013.01); *H04W 56/001* (2013.01); *H04W 84/06* (2013.01)

(58) Field of Classification Search
CPC ..... H04B 7/0617; H04B 7/086; H04W 16/28; H04W 24/10; H04W 56/001; H04W 84/06; H04W 64/003
(Continued)

(56) References Cited

U.S. PATENT DOCUMENTS

| 2010/0234045 A1 | 9/2010 | Karr et al. |
| 2018/0324678 A1 | 11/2018 | Chen et al. |

(Continued)

FOREIGN PATENT DOCUMENTS

| CN | 108700895 A | 10/2018 |
| CN | 114731180 A | 7/2022 |

(Continued)

OTHER PUBLICATIONS

"International Application Serial No. PCT/US2019/024957, International Search Report dated Dec. 20, 2019", 4 pgs.

(Continued)

*Primary Examiner* — Inder P Mehra
(74) *Attorney, Agent, or Firm* — Schwegman Lundberg & Woessner, P.A.

(57) ABSTRACT

Systems and methods of beamforming and improving mmWave communications for drones are described. Multiple RF chains are used to adapt the main beam to track changes without the use of pilot signals. To reduce interference, interfering signal power is eliminated by optimizing a non-Gaussian measure to extract the interferers. The AoA of signals from a target drone on neighbouring drones and location of the neighbouring drones and base stations are (Continued)

used to independently corroborate the location reported by the target drone. The base station provides additional synchronization signals below 6 GHz and restricts the search/measurement space in the vertical direction. The inherent sparse structure above 6 GHz is exploited by applying different beamformers on a sounding signal and estimating the AoA and impulse response. Variations of fully digital and hybrid beamforming architectures for multi-cell DL sync and CRS measurement are described.

25 Claims, 10 Drawing Sheets

(51) Int. Cl.
  *H04B 7/08* (2006.01)
  *H04W 24/10* (2009.01)
  *H04W 56/00* (2009.01)
  *H04W 64/00* (2009.01)
  *H04W 84/06* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2018/0359717 A1 | 12/2018 | Akkarakaran et al. | |
| 2019/0058508 A1 | 2/2019 | Yiu | |
| 2019/0180633 A1 | 6/2019 | Yoshizawa et al. | |
| 2021/0250892 A1* | 8/2021 | Kim | H04L 5/0048 |

FOREIGN PATENT DOCUMENTS

| | | |
|---|---|---|
| EP | 3792725 A1 | 3/2021 |
| KR | 20120061978 A | 6/2012 |
| WO | WO-2015112851 A1 | 7/2015 |
| WO | WO-2016159630 A1 | 10/2016 |
| WO | WO-2018061502 A1 | 4/2018 |
| WO | 2018085601 | 5/2018 |
| WO | 2018232090 | 12/2018 |

OTHER PUBLICATIONS

"International Application Serial No. PCT/US2019/024957, Written Opinion dated Dec. 20, 2019", 4 pgs.

Ericsson, "Reading SSB time index from PBCH", R2-1704092, 3GPP TSG-RAN WG2 Meeting #98, Hangzhou, China, (May 6, 2017).

"European Application Serial No. 19923465.9, Partial Supplementary European search report dated Sep. 30, 2022", 14 pgs.

"European Application Serial No. 19923465.9, Extended European Search Report dated Jan. 10, 2023", 12 pgs.

"Indian Application Serial No. 202147038659, First Examination Report dated Jan. 27, 2023", 5 pgs.

"European Application Serial No. 19923465.9, Response filed Jul. 4, 2023 to Extended European Search Report dated Jan. 10, 2023", 10 pgs.

* cited by examiner

TECHNIQUES FOR ELEVATED DEVICE COMMUNICATION

This application is a U.S. National Stage Filing under 35 U.S.C. 371 from International Application No. PCT/US2019/024957, filed Mar. 29, 2019 and published in English as WO 2020/204887 on Oct. 8, 2020 which is incorporated herein by reference in its entirety.

TECHNICAL FIELD

Aspects pertain to radio access networks (RANs). Some aspects relate to cellular networks, including Third Generation Partnership Project Long Term Evolution (3GPP LTE) networks and LTE advanced (LTE-A) networks, $4^{th}$ generation (4G) networks and $5^{th}$ generation (5G) New Radio (NR) (or next generation (NG)) networks. Some aspects relate to communication techniques used to enhance communications between terrestrial systems and a user equipment (UE) at an elevated altitude.

BACKGROUND

The use of various types of user equipment (UEs) using network resources continues to increase, as does amount of data and bandwidth being used by various applications, such as video streaming, operating on these UEs. Among the UEs, mobile devices operating at elevated altitudes and moving substantial distances is becoming increasingly common. The popularity of drones, for example, has exploded in the past several years, and low-altitude personal transportation devices are likely to be developed and used in the near future. The issues involving communications of the UEs with base stations (BSs) (also referred to as RANs), which are set up primarily for communication with ground-level UEs, coupled with the introduction of a complex new communication system engenders a large number of issues to be addressed both in the system itself and in compatibility with previous systems and devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
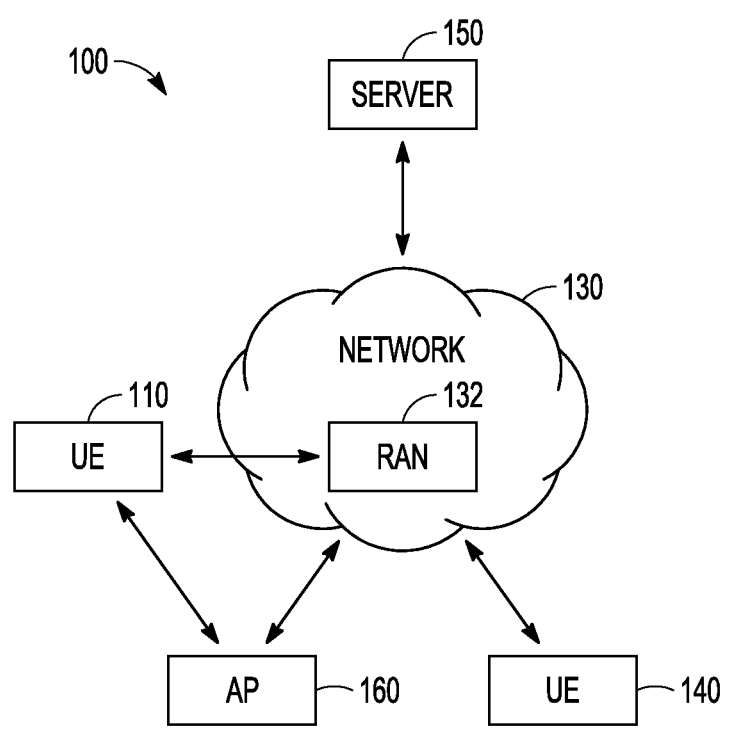
FIG. 1 is a functional block diagram illustrating a system according to some aspects.

FIG. 1 is a functional block diagram illustrating a system according to some aspects. The system 100 may include multiple UEs 110, 140. In some aspects, one or both the UEs 110, 140 may be communication devices that communicate with each other directly (e.g., via P2P or other short range communication protocol) or via one or more short range or long range wireless networks 130. The UEs 110, 140 may, for example, communicate wirelessly locally, for example, via one or more BSs 132 (also called BS nodes), WiFi access points (APs) 160 or directly using any of a number of different techniques, such as WiFi, Bluetooth or Zigbee, among others. The BS 132 may contain one or more micro, pico or nano base stations. The BS 132 may be, for example, evolved NodeBs (eNBs) or next ($5^{th}$) generation NodeBs (gNBs).

The UEs 110, 140 may also communicate through the network 130 via Third Generation Partnership Project Long Term Evolution (3GPP LTE) protocols and LTE advanced (LTE-A) protocols, 4G protocols or NR protocols. Examples of UEs 110, 140 include, but are not limited to, mobile devices such as portable handsets, smartphones, tablet computers, laptop computers, wearable devices, sensors and devices in vehicles, such as cars, trucks or drones. The UEs 110, 140 may communicate with each other and/or with one or more servers 150. The particular server(s) 150 may depend on the application used by the UEs 110, 140.

The network 130 may contain network devices such as an access point for WiFi networks, a base station (which may be e.g., an eNB or gNB), gateway (e.g., a serving gateway and/or packet data network gateway), a Home Subscriber Server (HSS), a Mobility Management Entity (MME) for LTE networks or an Access and Mobility Function (AMF), etc., for NG networks. The network 130 may also contain various servers that provide content or other information related to user accounts.

Figure 2:
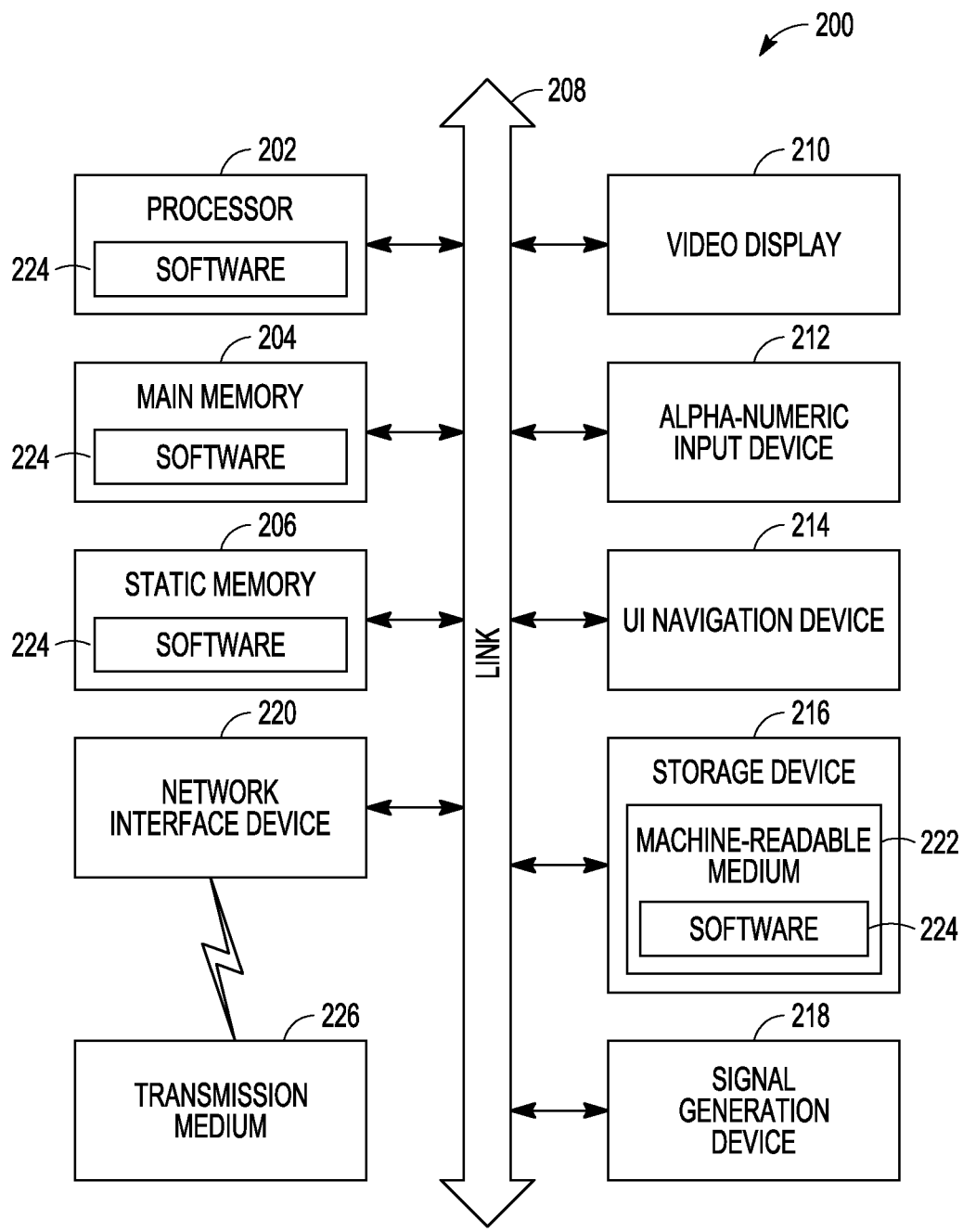
FIG. 2 illustrates a block diagram of a communication device in accordance with some aspects.

FIG. 2 illustrates a block diagram of a communication device in accordance with some aspects. Some of the elements shown in FIG. 2 may not be present depending on the type of the device. In some aspects, the communication device 200 may be a UE such as a drone, a specialized computer, a personal or laptop computer (PC), a tablet PC, a personal digital assistant (PDA), a mobile telephone, a smart phone, a web appliance (e.g., camera, doorbell, security apparatus), or other user-operated communication device. In some aspects, the communication device 200 may be a UE embedded within another, non-communication based device such as a vehicle (e.g., car) or home appliance (e.g., refrigerator). In some aspects, the communication device 200 may be a network-operated device, such as an AP, an eNB, a gNB, a to network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

As above, until recently, UEs disposed at elevated locations of over about 100 m above ground level were limited geographically and in mobility. This is to say that such UEs were disposed primarily in cities (with taller buildings) and the mobility limited to a particular building. This permitted base stations to provide communication support primarily to ground level devices, leaving UEs at elevated altitudes to connect via, for example, WiFi APs, and providing more limited coverage to such UEs. For typical UEs, this may be sufficient, especially when beamforming is not employed, and quality of service issues do not arise, as mobility-related issues usually do not arise within buildings. However, the rapid expansion in the use of unmanned aerial vehicles (UAVs), also known as drones, has led to issues with communications between the drones and terrestrial systems. For example, to extend the safety and reliability of drone operation beyond visual line-of-sight (LoS) range, it may be desirable to extend the existing cellular network into an infrastructure that achieves key performance indicators for reliable drone operation and management.

While, as above, networks provide good coverage to terrestrial users with high throughput and reliable handover, the channel, interference, and mobility environments of drones may be different from that of typical terrestrial UEs. The situations for drones are more challenging for current systems at least in part because the main lobe of the existing BS points toward ground UEs. Thus, drones may only be able to be served by the BS with sidelobes, which are narrower and carry less power than the main lobe. Drones may also receive a greater number of signals from different BSs due to LoS propagation (the lack of objects impeding BS transmissions), leading to a much harsher interference condition than that of typical ground UEs. In particular, the situation degenerates with increasing drone altitude, to the extent that a large number of dead zones (coverage holes) may be created with respect to drones in high altitude, e.g., above a predetermined height (above ground level) such as 100 m. Note that throughout the description, transmission of the various signals includes generation and encoding of the signals from the transmitting device and reception of the various signals includes decoding and storage of the received signals.

The existence of coverage holes raises several technical issues to solve. These issues include, for example, drone mobility and severe interference by ground UE communications. Mobility involves a UE engaging in a 3GPP handover procedure that includes multiple signals between various devices, such as transmission of a measurement report by the UE to the BS (measuring the cell reference signal (CRS) of various BSs) and in response a Radio Resource Control (RRC) Connection Reconfiguration message by the BS to the UE, transmission of a handover request and response between the source and target BS, exchange of a path switch request and response between the target BS and the mobility management entity (MME), and exchange of user plane request and response between the MME and serving gateway (S-GW).

Of the above communications associated with the 3GPP handover process, the over the air communications between the UE and BS may be problematic for drones. In particular, a 20~30% handover failure ratio exists for high-altitude drones (above 100 m) due to the coverage holes in the existing cellular network. For drones to comply with the handover procedure, the drones should be able to receive signals on data and control channels, and simultaneously measure CRS signal strength of multiple candidate cells. In particular, for mobility support, UEs may perform measurement on the signal strength of the neighboring cells and report a set of Radio Resource Management (RRM) measurements of the neighboring cells to the serving cell. Each RRM measurement may include Reference Signal Received Power (RSRP) and/or Reference Signal Received Quality (RSRQ), among others, of the CRS of each neighboring cell. This measurement may be performed before the UE switches from a source serving cell to a target serving cell during actual handover.

Most drones, however, include a single omni-directional antenna, and may thus be unable to measure the CRS of one or more of the cells due to the poor signal-to-interference ratio (SINR) at high altitude. In particular, the UE should be able to complete downlink synchronization (DL sync) based on the primary synchronization signal (PSS) and secondary synchronization signal (SSS) for multiple candidate cells and proceed to measure the characteristics, e.g., the RSRP on the CRS of the candidate cells. Such PSS/SSS signals are designed to be robust enough for all typical ground UEs to successfully decode them. However, drones are subject to very low SINR mainly because of downtilting and a significant amount of LoS inter-cell interference so that drones often cannot detect the PSS/SSS signals, even if the SNR of the PSS/SSS signals would otherwise be detectable by low altitude/ground level UEs.

While analog/RF beamforming may be applied to enhance a particular cell/direction, such solutions may be unable to provide large enough degrees of freedom in receive beamforming directions to enable simultaneous data reception and multicell measurement. Moreover, because of enhanced LoS propagation above the predetermined height (say, the BS height), the cell signals reaching a drone may be stronger than those reaching the same drone at ground level. This means that conventional multi-cell measurement may lead to excessive reports, which may in turn result in incomplete handover of high-speed drones.

In some aspect, Full Dimension Multiple-Input-Multiple-Output (FD-MIMO) may be used at the BS and/or directional beamforming at the drone to mitigate or eliminate the above mobility issue and enhance the data rate. FD-MIMO may enable the BS to beamform in both the horizontal and vertical direction so that the BS can cover anywhere in a 3D space. The use of directional beamforming at drones can be of use to reduce the high handover failure ratio to a tolerable level. FD-MIMO assumes that DL sync of the drone by the BS, as well as decoding of the Physical Downlink Control Channel (PDCCH) have already been performed. Whether or not these have been accomplished, mobility related signals and channels, however, such as the PSS, SSS, CRS, Physical Broadcast Channel (PBCH), Physical Random Access Channel (PRACH), and PDCCH are not beamformed, resulting in the coverage holes. Therefore, multicell measurement for mobility may become a bottleneck in FD-MIMO systems without further development.

Directional beamforming, on the other hand, may be implemented by analog/RF beamforming, without impact on cellular standards and modem implementation. While directional beamforming can boost drone data throughput and improve handover performance for drones along a particular direction, this may be insufficient to provide large enough degrees of freedom in receive beamforming directions so as to enable simultaneous data reception and multicell measurement. The insufficiency may be due to multicell measurement with sidelobes at the drone (sidelobe-to-sidelobe link), where one sidelobe is on the BS side and the other sidelobe is on the drone side.

Instead, a different beamforming solution and architecture design may be used for simultaneous data reception and multicell measurement at the drones for mobility. Receive beamforming at the drones may permit boosting the SINR of the PSS/SSS and the CRS. To complete a parallel cell search within the predetermined time period, in some aspects a receive beamforming architecture for simultaneously monitoring multiple directions has been developed that takes advantage of synchronization done in the time domain. To this end, receive beamforming may performed before fast Fourier transform (FFT) processing, unlike normal digital beamforming. This may permit drones capable of simultaneously receiving signals from multiple receive directions to perform other cell searches based on the PSS/SSS. The drones may be able to perform multiple receive beamforming for multicell measurement for mobility and simultaneously to receive the PDSCH from the serving cell and transmit the associated PUSCH.

In review, DL sync is a three-stage procedure which may be performed when the UE is switched on or when the UE loses synchronization. In the first stage, the UE retrieves the fractional frequency offset (FFO) and acquires coarse information about the orthogonal frequency-division multiplexing (OFDM) symbol timing. This operation is typically accomplished in the time domain using a cyclic prefix (CP)-based delay correlation method. After FFO correction and CP removal, the resulting samples are converted in the frequency domain using a discrete Fourier transform (DFT) unit. The second stage detects the position of the PSS within the received DL signal and recovers the Zadoff-Chu (ZC) root index. These tasks can be accomplished either in the time or frequency domain, and may provide subframe timing information as well as the sector ID. In the third stage, the SSS is used to obtain the cell ID group and the frame boundary. As the SSS is located in the symbol immediately preceding the PSS, the latter is normally used as a phase reference to perform coherent detection of the SSS in the frequency domain. The integer frequency offset (IFO) can be estimated either in the second or third step by evaluating the frequency domain shift of the received PSS or SSS at the DFT output.

Figure 3:
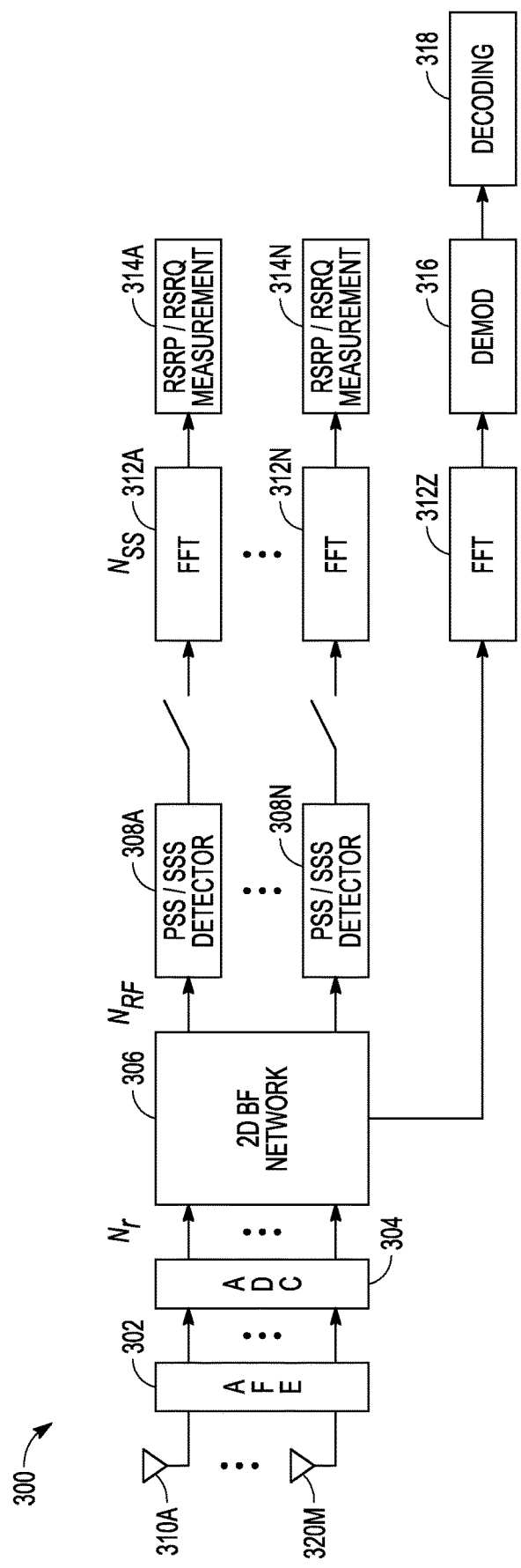
FIG. 3 illustrates a receiver in accordance with some aspects.

The UE may generally perform filtering to extract 62 PSS/SSS subcarriers out of the entire whole band. This filtering may be performed in the time domain. For the time-domain correlator to successfully detect the PSS and retrieve the FFO and coarse timing in the $1^{st}$ stage, The SINR of the PSS should be reasonably good, such as being above about −6 dB. Since this is not the case with high-altitude drones, a two-dimensional (or one-dimensional) beamforming network before PSS/SSS detector in the time domain. FIG. 3 illustrates a receiver in accordance with some aspects. In particular, FIG. 3 shows a high level block diagram of a fully digital beamforming architecture for multi-cell DL sync and CRS measurement.

The receiver 300 may be incorporated in a drone or other high-altitude UE. Some components used in the receiver 300 shown in FIG. 3 may not be shown for convenience. The receiver 300 may receive CRS via $N_r$ multiple omni-directional antenna elements 310a-310m. The signals received at the antennas 310a-310m may be received at an analog front end (which may include amplifiers, filters, buffers and downconversion circuitry, for example) 302 and each of the resulting analog signals digitalized at an analog-to-digital converter (ADC) 304 to produce a Nr dimensional vector. The vector may be supplied to the 2D beamforming network 306, which may produce $Nm_{RF}$ Rx beamformed signals, where $N_{RF}$ is the number of Rx beams that point in different directions.

Each of the $N_{RF}$ Rx beamformed signals from the 2D beamforming network 306 may be supplied to the input of a PSS/SSS detector 308a-308n, where the coarse timing and FFO of the particular signal are determined. Once $N_{SS}$ different cells are detected out of the $N_{RF}$ beamformed signals, the detected signals are then fed to an FFT block 312a-312n and a fine timing/frequency offset sync block that determines fine timing and the IFO of the received signals. Since a portion of synchronization is done in the time domain, the receive beamforming may thus be performed before the FFT operation.

The RSRP and/or RSRQ may then be measured at an RRM block 314a-314n based on the CRS received in the frequency domain. Although not shown, the drone can send an LTE measurement report containing the RSRP/RSRQ for mobility support. In addition, PDCCH/PDSCH reception (demodulation and decoding) and PUCCH/PUSCH transmission may be conducted using one of the $N_{RF}$ beamformed signals, at the same time as the multicell measurement. The PDCCH/PDSCH reception may use similar components as the measurement, in which the beamformed signal of the serving cell supplied from the beamforming network 306 is provided directly to an FFT 312z of the FFT block and the output of the FFT 312 demodulated by a demodulator 316 and decoded by a decoder 318.

Figure 4:
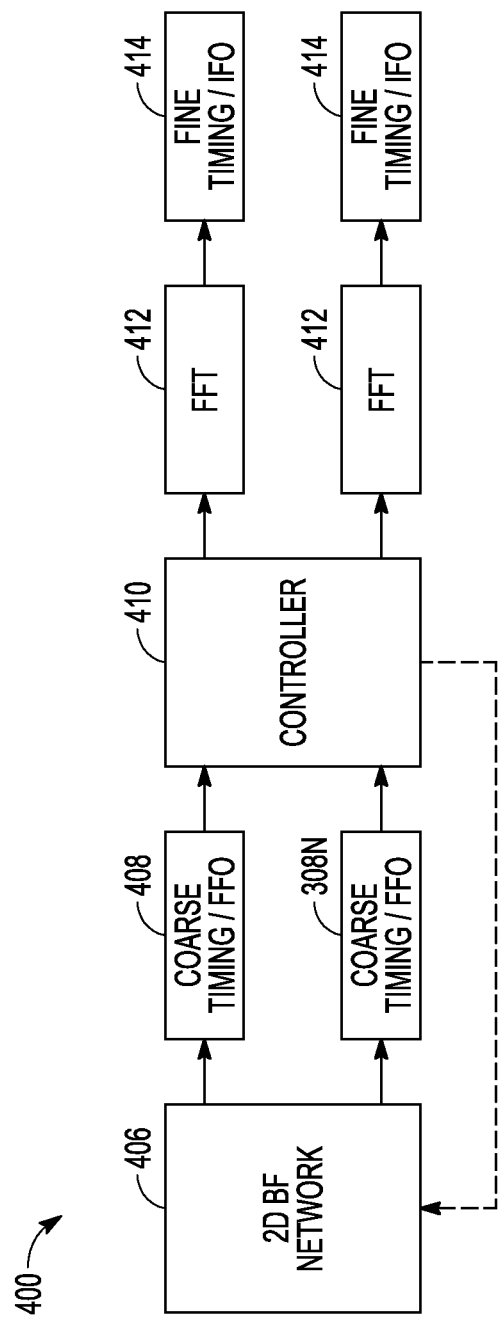
FIG. 4 illustrates a block diagram of a controller for a beamforming network in accordance with some aspects.

FIG. 4 illustrates a block diagram of a controller for a beamforming network in accordance with some aspects. As above, some components of the controller in FIG. 4 may not be shown for convenience. Assuming the number of PSS/SSS detectors, $N_{RF}$, is insufficient relative to multiple directions to search for a meaningful measurement report, a beam controller may be used to adjust the directions to search. Similar to FIG. 3, the output signals from beamforming network 406 may processed to determine the coarse timing and FFO 408. Based on the coarse timing and FFO of the signals, a controller 410 may provide feedback to the beamforming network 406 to adjust the beam direction. The controller 410 should be able to quickly decide based on the correlator output which beam direction does not point toward strong neighboring cells and to discard that beam and switch to another beam. If a strong correlation is indicated, the signals may be supplied to the FFT block 412 and then the IFO determined 414. For time-domain beamforming methods, either a codebook-based approach or adaptive approach may be used.

In some aspects, the Unmanned Traffic Management (UTM) (or Unmanned Aircraft Systems (UAS) Traffic Management) information may be used to control the beamforming network. The UTM may be available at the BS. The UTM may include the 3D position, speed, and navigation information of each drone served by the BS. This may enable the BS to provide the relevant UTM to the drone. The UTM may permit the drone to adjust the receive beam directions of candidate neighboring cells for mobility support by higher layer signaling.

Figure 5:
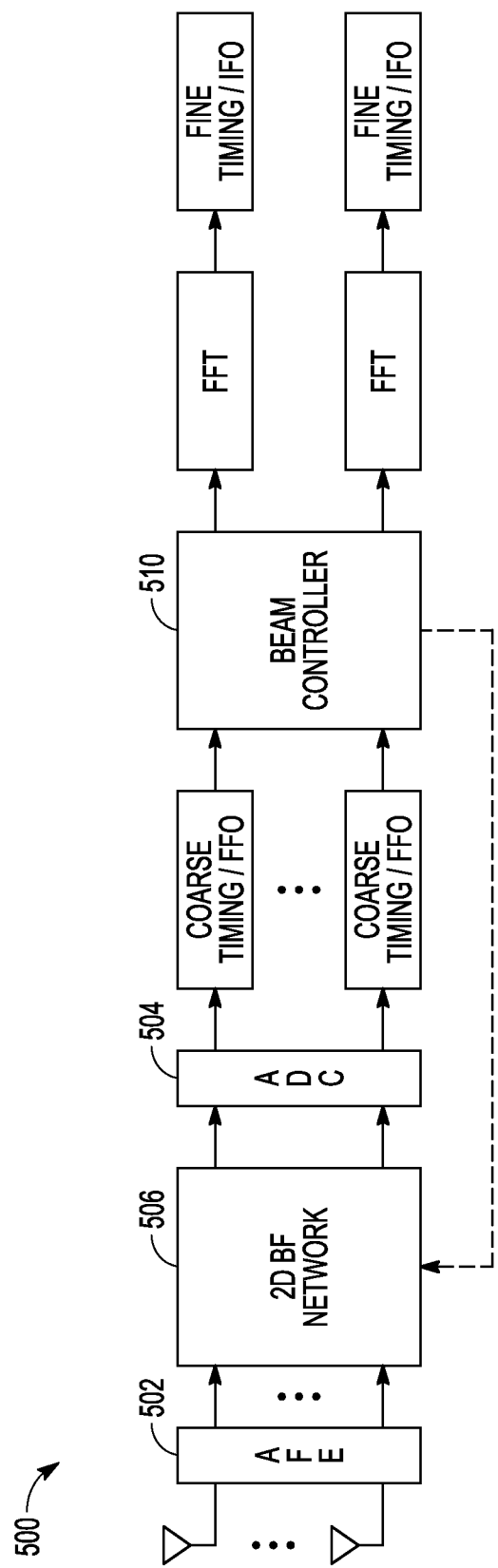
FIG. 5 illustrates a hybrid beamformer in accordance with some aspects.

FIG. 5 illustrates a hybrid beamformer in accordance with some aspects. The hybrid beamformer 500 contains the same elements as the fully digital beamforming architecture of FIG. 3 and the controller of FIG. 4. However, the beamformer 500 is different—unlike the fully digital beamforming architecture, in which the beamforming network is disposed after the ADC, the beamforming network 506 is disposed between the AFE 502 and the ADC 504. Thus, the hybrid beamformer 500 employs analog beamforming rather than the digital beamforming of FIG. 3. Like FIG. 4, however, the beamforming network 506 is controlled by a digital feedback signal from the beam controller 510 as determined by the coarse timing and FFO of the digitized beamformed signals.

The structure of the synchronization signals detected by the drone are different depending on whether the 3GPP system is an LTE/4G or a 5G NR system. When 5G NR systems are employed for communication between the BS and drone, if an outage in the DL sync signals occurs a substantial bottleneck may result because of the limited Sync Signal (SS) blocks supported by the 5G NR system.

Figure 6:
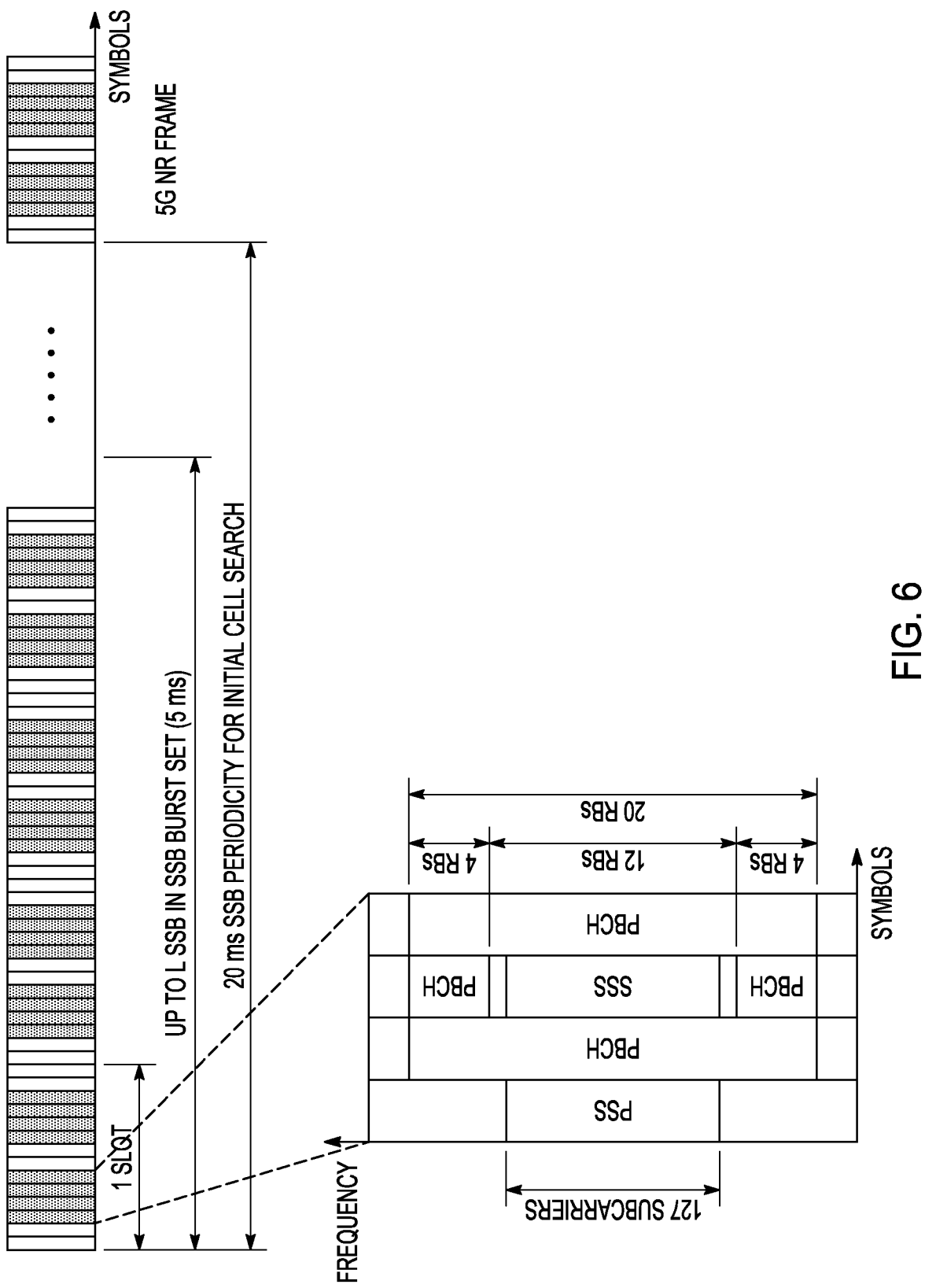
FIG. 6 illustrates a 5G NR synchronization signal block structure in accordance with some aspects.

FIG. 6 illustrates a 5G NR synchronization signal block structure in accordance with some aspects. Each slot in the 5G NR system may include 14 OFDM symbols. The time domain transmission pattern of the NR SS blocks may be cell-specific rather than being UE-specific. The time domain transmission pattern may also be dependent on the subcarrier spacing and frequency range, as well as other parameters. The NR SS blocks may be disposed in the center frequencies of the bandwidth used by the cell for communication. In particular, as shown in FIG. 6, the 5G NR system only supports at most 4 SS blocks for a frequency range below 3 GHz, 8 SS blocks for a frequency range between 3 GHz and below 6 GHz and 64 SS blocks for a frequency range between 6 GHz and 52.6 GHz.

An SS block includes the PSS, SSS and PBCH. A SS burst represents one or more SS block(s). A SS burst set includes of one or more SS burst(s) with a configurable transmission period. In some aspects, the default transmission period may be 20 ms. As shown, the SS block consists of 240 contiguous subcarriers (20 RBs) and 4 OFDM symbols. Beam sweeping may be employed in 5G NR for SS block transmissions. In this case, multiple SS blocks may be transmitted periodically at about 20 ms intervals. In addition, the transmission of SS blocks within a single SS burst set may be limited to a subset of time in the transmission period (e.g., a 5 ms window in the transmission period). The frequency location of the SS block may be configured by higher-layer (RRC) signaling to support a sparser search raster in order to detect the SS block.

However, the sparseness of the SS block transmission in 5G NR systems may cause issues that are exacerbated at the lower frequencies. In particular, the wideband SINR distribution of 4 SS blocks at a carrier frequency 2 GHz shows more than 12% drones are out of sync. Compared to the outage probability of ground UEs, a 12% sync outage is significant. In short, 4 SS beams may be insufficient to support drones as well as ground UEs.

A repetition and/or accumulation scheme (coverage enhancement) may be used to boost the channel quality of handover-related signals and channels for drones. Drones with poor channel quality (e.g., SINR below −10 dB) can establish a DL sync to neighboring cells and transmit the measurement report to the serving cell (and/or one or more of the neighboring cells, which may be coupled to the serving cell via an X2 or Xn interface). However, to provide a measurement report, a drone may measure a large number of candidate cells with multiple SS beams, which repeats every 20 ms as a default for initial access. Thus, it may take a substantial amount of time for the drone to accumulate each SS block over, say, 10 periods (200 ms). This latency continues to add for each step in the handover procedure (from measurement control to transmission of an RRC Connection Reconfiguration Complete message). The use of coverage enhancement may thus increase the latency for the entire handover procedure including measurement report, yielding a significant impact on handover performance.

Instead of, or in addition to, the use of the coverage enhancement technique, a UE-specific SS block configuration may be used to support reliable mobility performance of drones while maintaining limited search complexity. By leveraging vertical separation between drones and ground UEs, the SS blocks for a UE to search may be restricted in vertical domain to retain the same number of SS blocks per UE, but with less DL sync outage probability of drones because of better vertical beams. Furthermore, the UE-specific SS block configuration can significantly reduce the UE complexity in terms of initial access above 6 GHz.

In advance of using the UE-specific SS block, the network may identify drones and their altitudes, keeping track via the UTM information above. Below 6 GHz, the mobility support for drones can be improved by increasing the number of SS blocks in the vertical domain. If, for example, 8 SS blocks are able to be used below 3 GHz instead of the 4 SS blocks currently specified in NR, the computational complexity of UE may be increased in terms of initial access. It would be desirable, however, to keep at least the same complexity as the case of 4 SS blocks as well as achieving a better mobility support of drones with more vertical beams.

Figure 7:
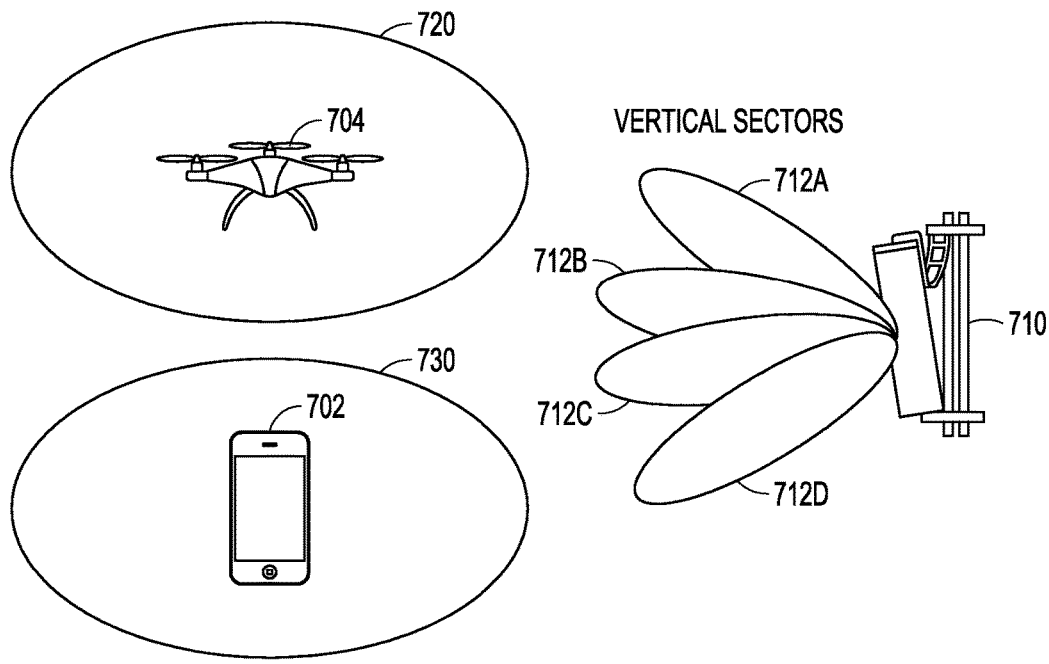
FIG. 7 illustrates a spatial separation between drones and ground UEs in the vertical domain in accordance with some aspects.

This can be achieved by noticing that most drones fly above the height of the BS (e.g., 25 m or 15 m), whereas ground UEs are most likely to be below the BS height. FIG. 7 illustrates a spatial separation between ground UEs and drones in the vertical domain in accordance with some aspects. As shown in FIG. 7, the vertical separation between ground UEs 702 and drones 704 may be leveraged to introduce UE-specific SS blocks that are dependent on the vertical sector 720, 730 occupied by the ground UE 702 or drone 704. In particular, a restriction may be imposed on SS blocks for a UE to search for mobility or measurement purposes. For instance, if 2 horizontal SS beams and 4 vertical SS beams 712*a*-712*d* are transmitted by the BS 710, the ground UEs 702 may be restricted to only search/measure neighboring cells based on the lower 2 vertical SS beams 712*c*, 712*d* and the drones 704 may be restricted to only search/measure the upper 2 vertical SS beams 712*a*, 712*b*.

As above, for 5G NR systems, the numerology and pattern (or position) of the SS burst set may depend only on the carrier frequency for initial access so that the SS block configuration is cell-specific and does not change over time. To retain the number of SS blocks per UE as well as to enhance the mobility performance of drones, for drone mobility, the SS block configuration may be altered to be UE-specific and may change semi-statically. For instance, in the RRC connected mode, a UE (either drones or ground UEs) can be informed by higher-layer signaling to limit its search/measurement to restricted SS blocks as increasing the number of SS blocks used concurrently increases the UE complexity in terms of cell search, radio link failure recovery, measurement report, etc.

Either static or semi-static higher-layer signaling of the SS block may be used. To use static signaling, the RRC signaling does not change in the connected mode. Semi-static signaling, while more complicated, may be useful if the drone varies in height to transition between the vertical sectors (e.g., from high altitude to below the BS height). Semi-static signaling may combine RRC signaling and Medium Access Control (MAC) Control Element (CE) signaling, where the latter can change the SS block restriction patterns in the RRC connected mode, depending on the UE height information. Such UE height information can be given by a height-triggered measurement report from corresponding UEs.

In some aspects, an on/off bitmap may be used for the SS block restriction pattern. Let $N_1$ and $N_2$ denote the number of SS beams in the $1^{st}$ dimension (e.g., horizontal domain) and the $2^{nd}$ dimension (e.g., vertical domain), respectively. Taking the signaling overhead into account, different control can be effected over the SS block restriction pattern in the different domains. For instance, several bitmaps of length $\{1, N_1, N_2, N_1*N_2\}$ may be defined. For a one-bit signal, a subset of SS beams may be predetermined for a certain UE to search or measure. For the bitmap of length $N_1$ (or $N_2$), the BS may restrict the SS beams for a UE to a subset of SS beams only in the $1^{st}$ (or $2^{nd}$) dimension. For a bitmap of length $N_1*N_2$, the BS may arbitrarily turn a particular SS beam on/off in both $1^{st}$ and $2^{nd}$ dimensions. Drones are likely to experience LoS channel propagation so that a good SS beam for a certain drone may not change dynamically and may also be predictable, unlike ground UEs. Accordingly, a flexible SSB restriction pattern may be useful. The above bitmap may be provided when the drone is in the RRC Connected mode. In some aspects, similar signaling may be provided to the drone when in Idle mode to instruct the drone to search or measure a particular subset of SS blocks.

In some aspects, the BS may use information about SS block usage to further reduce the search/measurement burden on the drones. In particular, one or more SS blocks, which are dependent on the positions of the UEs and the corresponding SS block restriction, may be unused by the BS. Given this information, the BS can inform the UEs via higher layer signaling regarding which SS blocks among the available SS blocks are actually transmitted. This may permit the UEs to perform rate matching for the PDSCH and PDCCH. To utilize the above SSB restriction, the information exchange may be performed among neighboring BSs in terms of a UE-specific SS block restriction as well as a cell-specific SSB configuration through higher-layer signaling via, e.g., via an X2/Xn interface or air interface among the BSs.

As an alternative, UTM information may be used to provide a SS block restriction. In this case, the BS can deactivate the upper vertical SS beams when there is no drone that is present or expected in the upper vertical sector, according to the UTM information. In some aspects, the BS can also inform a UE of the foregoing SS block restriction patterns based on the UTM information. By doing so, SS block resources may be saved by deactivating some of the signaling, allowing data to be sent if desired.

To provide beamforming, multiple antennas may be used by both the BS and the drone. Further, wireless systems operating above 6 GHz enable deployment of a massive number of antennas at the BS and user equipment (UE). To reduce RF power consumption and cost efficiency, these systems generally employ fully analog or hybrid digital analog (HDA) transceiver architectures. Adaptive beamforming techniques may be used at such frequencies to overcome high signal attenuation. Channel state information (CSI) may be used to implement adaptive beamforming. In a wideband communication channel having multiple antenna elements, the CSI may fluctuate in space, time and frequency, and therefore CSI may be measured in all three dimensions. The BSs may periodically may transmit known reference symbols (RS) (also referred to as pilots) so that the CSI can be estimated at each receiving node using the pilots. Unfortunately, as the number of antennas increases the feasibility of measuring the CSI between each transmit-receive antenna pair. In addition, mmWave systems may utilize a large signal bandwidth (e.g., 1 GHz), which means large number of RSs may be used to acquire CSI for the entire bandwidth. For highly mobile UEs such as drones, the CSI acquisition latency is thus a useful performance metric.

In sub 6 GHz systems (sub mmWave systems), orthogonal RSs are used to measure CSI variations, where each transmit antenna sends its unique RS signature comprising symbols distributed densely in time and frequency. Both frequency division multiplexing (FDM) and code-division multiplexing (CDM) based orthogonal RSs have been used. Further to this, channel sounding and channel estimation may be split into two steps. In the channel sounding step, beam sweeping/synchronization is performed between the transmitter (BS) and receiver nodes (UE/drone). In the channel estimation step, orthogonal RSs are transmitted between each pair of transmit and receive beams and channel estimation is performed using the methods described above. The use of multiple steps for beam management and channel estimation, however, may significantly increase the latency.

Instead, a combined beam management and channel estimation technique may be used. A transceiver may detect optimal beamforming vectors as defined by a codebook and estimate the multi-path channel coefficients for each beamforming vector. The channel estimate may be used to determine a CSI feedback message that includes the channel quality indicator (CQI), Pre-coding Matrix Indicator (PMI), Rank Indicator (RI), among others. In particular, the inherent propagation characteristics of the mmWave channel may be exploited.

Figure 8:
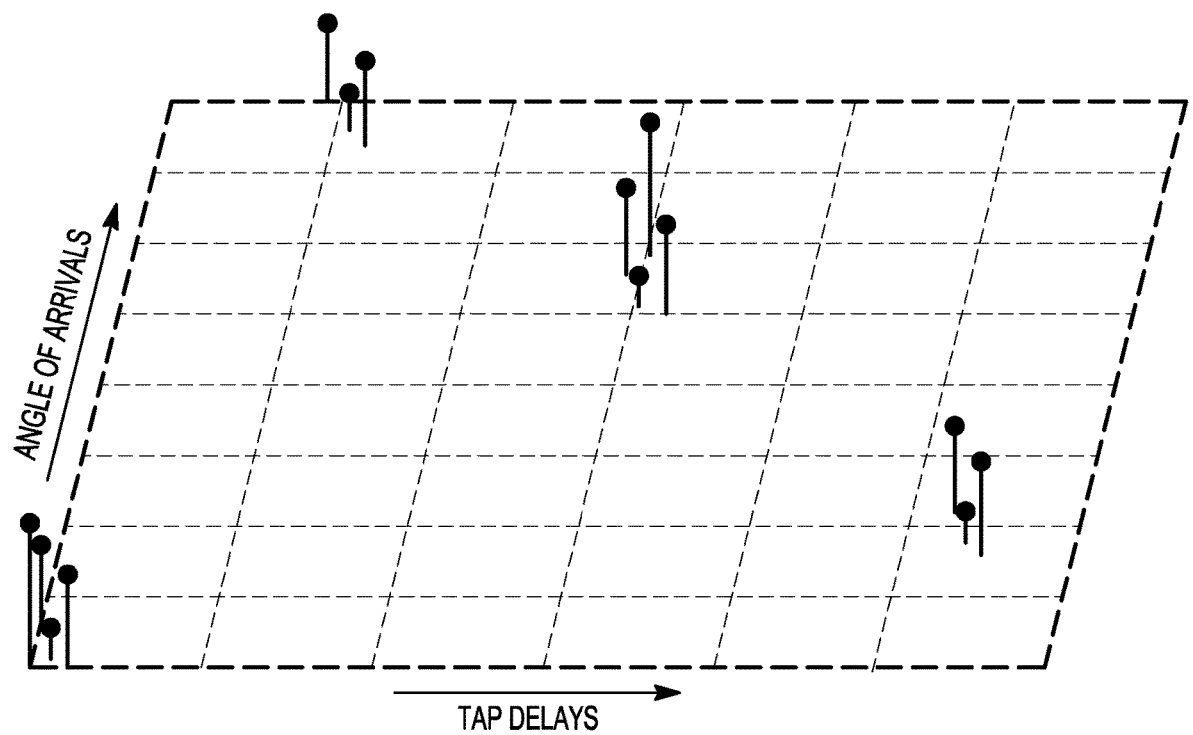
FIG. 8 illustrates a mmWave channel in accordance with some aspects.

FIG. 8 illustrates a mmWave channel in accordance with some aspects. In particular, FIG. 8 shows a schematic of mmWave signal propagation showing signals arrive through sparse cluster of channel taps existing along several angular directions. The mmWave channel can be represented under a sparsifying basis (e.g., a DFT codebook) as a sparse multi-path multi-angular wireless channel. Each angular direction may represent signals arriving from/to a cluster of scatterers. The overall delay spread of the channel may be large. But, as shown a mmWave channel carries signals only along a few angular directions and has a very small delay spread at each angular direction. As illustrated, mmWave channels exhibit almost flat frequency response along each angular direction.

These properties are used to enable each receiving node to receive a signal with fully-analog random beamforming and subsequently perform channel estimation along each signal bearing Angle of Arrival (AoA) direction. The AoA is the angle between the reception direction of a reference signal from a linear antenna array and the normal axis of the array. In some cases, the Time Difference of Arrival (TDOA) may be measured at individual elements of the array. The received AP signal between successive antenna elements may be phase-shifted, and the degree of phase shift may depend on the AoA, the antenna element spacing, and the carrier frequency. By measuring the phase shift and using known characteristics, the AoA can be determined. This may provide significant reduction in sounding codewords used for beam selection and channel estimation.

The system may be modeled as a wireless network with a receiving node equipped with a large number of antennas $N_R$ and a transmitting node equipped with a large number of antennas $N_T$. Assuming OFDM transmission in which bandwidth B GHz is divided into N equi-spaced sub-carriers, the wireless channel on sub-carrier k is given by the matrix $H[k] \in \mathbb{C}^{N_R \times N_T}$. Note, however, that the scheme described herein is not limited to OFDM based systems. For example, this scheme is applicable to single carrier FDM systems.

Figure 9:
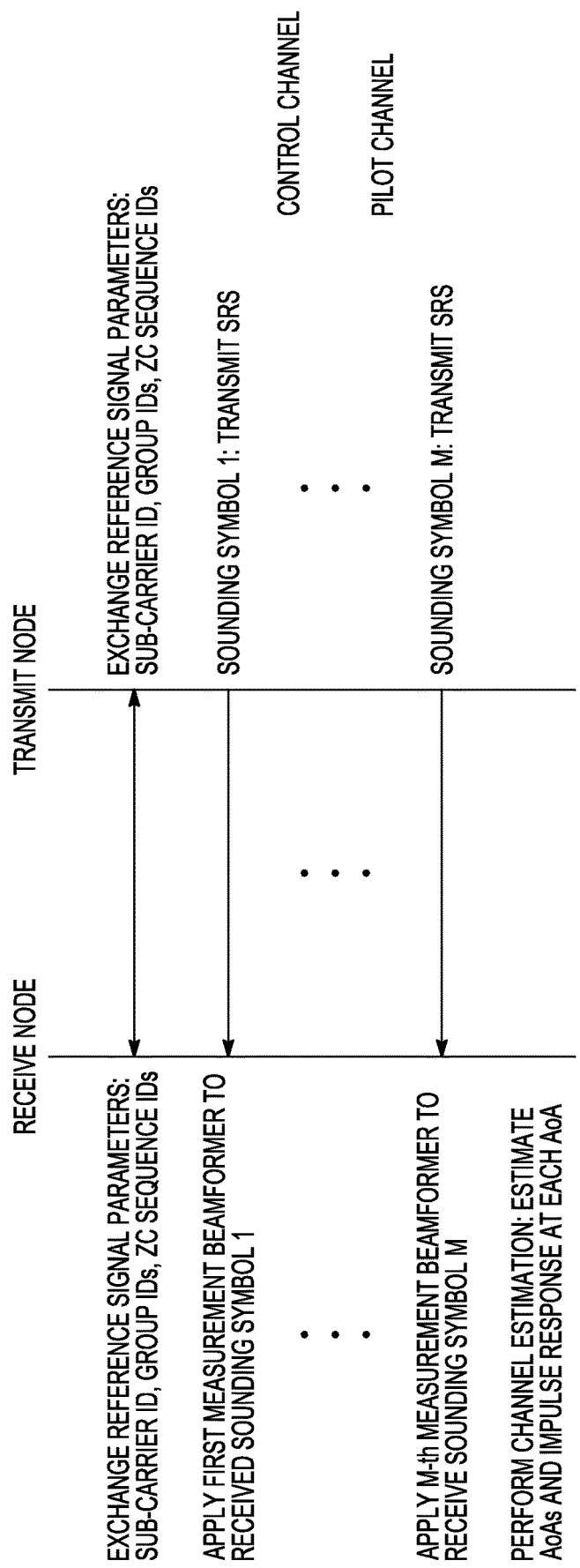
FIG. 9 illustrates a flow diagram for compressed Channel State Information (CSI) acquisition protocol in accordance with some aspects.

A mathematical framework is described for channel estimation and beam management in which the measurements overhead is significantly reduced compared to state-of-the art solutions. The RS used may be 5G pilot signals (e.g., SS block or CSI-RS). Reduction of measurement overhead is achieved by exploiting the inherent sparse structure of wireless channels above 6 GHz. In some aspects, beamforming alignment may be based on calculations at the receive node only. The technique described may enable joint detection of Rx beams and estimation of multipath channel impulse response. FIG. 9 illustrates a flow diagram for compressed CSI acquisition protocol in accordance with some aspects.

As shown in FIG. 9, the transmitting and receiving nodes are assigned RS sub-carrier groups (as described by the underlying standard). The RS signal parameters, including the sub-carrier ID, the group IDs and the ZC sequence IDs are exchanged between the transmitting and receiving nodes. Each RS sub-carrier group has P frequency locations that are uniformly spaced across the entire bandwidth used by the cell. Each RS sub-carrier group may be assigned to different transmitting nodes. For example, a transmitting node assigned to the i-th RS sub-carrier group may transmit symbols $X_i=[X_{i_0}, X_{i_1}, \ldots X_{i_{P-1}}]$, where $i_k$ is the k-th randomly generated sub-carrier location in the RS sub-carrier group.

Next, each receiving node having $N_R$ antenna elements may use M random beamformers. Each random beamformer may be a $N_R \times 1$ vector of independent random phases generated using $N_R$ phase shifters. In one example, each set of random phase shifters could be circularly symmetric complex Gaussian vectors. Note that $M<N_R$, which is sub-Nyquist sampling in the AoA space. In an alternative, a receive measurement codebook can also be designed based on criterion like weighted pseudo random beamforming with adaptive weight updates that are provided by the base station and are adaptive to channel conditions of the sub-carrier group.

Similar to the receive codebook, a transmit codebook may use a small ($<N_T$) number of random transmit beamformers. For simplifying the mathematical formulation, without loss of generality, it is assumed that each transmitting node uses an optimal transmit beamformer $w_i \in \mathbb{C}^{N_T \times 1}$. Then the mmWave channel from the i-th transmitting node to the receiving node is given by $h_i[k]=H_i[k]w_i$, which is a $N_R \times 1$ vector channel on sub-carrier k.

Channel sounding may be performed on M consecutive OFDM symbols, where each OFDM symbol is N samples long with an inter sub-carrier frequency $\delta f$ and signal bandwidth N $\delta f$. A different random beamformer $\varphi_m \in \mathbb{C}^{N_R \times 1}$ may be used by the receiving node in each OFDM symbol. Next, the received signal in the $i_k$-th sub-carrier of the m-th OFDM/SC-FDMA symbol may be given by:

$$y_m[i_k]=\varphi_m^H(h_i[i_k]X_{i_k}+n_m[i_k]), k=0,\ldots,P-1$$

Channel estimation may be performed using M×P samples of received signal received during M OFDM/SC-FDMA symbols. An alternative representation of the frequency domain received signal from all M OFDM symbols may be given as:

$$\begin{pmatrix} y_0(i_0) & \ldots & y_{M-1}(i_0) \\ \vdots & \ldots & \vdots \\ y_0(i_{P-1}) & \ldots & y_{M-1}(i_{P-1}) \end{pmatrix} =$$

$$\begin{pmatrix} X_{i_0} & \ldots & X_{i_0} \cdot e^{-j\frac{2\pi}{N}i_0(D-1)} \\ \vdots & \ldots & \vdots \\ X_{i_{P-1}} & \ldots & X_{i_{P-1}} \cdot e^{-j\frac{2\pi}{N}i_{P-1}(D-1)} \end{pmatrix} \times \begin{pmatrix} \tilde{h}_{0,0} & \ldots & \tilde{h}_{N_R-1,0} \\ \vdots & \ldots & \vdots \\ \tilde{h}_{0,D-1} & \ldots & \tilde{h}_{N_R-1,D-1} \end{pmatrix} \times$$

$$\begin{pmatrix} b_{0,0} & \ldots & b_{0,N_R-1} \\ \vdots & \ldots & \vdots \\ b_{R-1,0} & \ldots & h_{N_R-1,N_R-1} \end{pmatrix} \times \begin{pmatrix} \varphi_{0,0} & \ldots & \varphi_{0,M-1} \\ \vdots & \ldots & \vdots \\ \varphi_{N_R-1,0} & \ldots & \varphi_{N_R-1,M-1} \end{pmatrix} +$$

$$\begin{pmatrix} n_0(i_0) & \ldots & n_{M-1}(i_0) \\ \vdots & \ldots & \vdots \\ n_0(i_{P-1}) & \ldots & n_{M-1}(i_{P-1}) \end{pmatrix}$$

Where:

$$X \triangleq \begin{pmatrix} X_{i_0} & \ldots & X_{i_0} \cdot e^{-j\frac{2\pi}{N}i_0(D-1)} \\ \vdots & \ldots & \vdots \\ X_{i_{P-1}} & \ldots & X_{i_{P-1}} \cdot e^{-j\frac{2\pi}{N}i_{P-1}(D-1)} \end{pmatrix}$$

is a P×D reference symbol matrix with each column representing a rotation corresponding to the channel tap arriving at that delay, $$\tilde{H} \triangleq \begin{pmatrix} \tilde{h}_{0,0} & \ldots & \tilde{h}_{N_R-1,0} \\ \vdots & \ldots & \vdots \\ \tilde{h}_{0,d-1} & \ldots & \tilde{h}_{N_R-1,d-1} \end{pmatrix}$$

is a D×$N_R$ channel tap matrix, where the j-th row represents the channel tap arriving at the j-th sample delay from $N_R$ angular directions, and $$B \triangleq \begin{pmatrix} b_{0,0} & \ldots & b_{0,N_R-1} \\ \vdots & \ldots & \vdots \\ b_{R-1,0} & \ldots & h_{N_R-1,N_R-1} \end{pmatrix}$$

is a $N_R \times N_R$ sparsifying angular basis. In one example B is a DFT matrix, $$\Phi \triangleq \begin{pmatrix} \varphi_{0,0} & \ldots & \varphi_{0,M-1} \\ \vdots & \ldots & \vdots \\ \varphi_{N_r-1,0} & \ldots & \varphi_{N_R-1,M-1} \end{pmatrix}$$

is a $N_R \times M$ random beamformer matrix, and $$Z \triangleq \begin{pmatrix} n_0(i_0) & \ldots & n_{M-1}(i_0) \\ \vdots & \ldots & \vdots \\ n_0(i_{P-1}) & \ldots & n_{M-1}(i_{P-1}) \end{pmatrix}$$

is a P×M receiver noise matrix.

As described earlier and depicted in FIG. 8, the channel tap matrix $\tilde{H}$ may be a sparse in row and column space. Therefore, random sampling may be performed along the row space of $\tilde{H}$ at a sub-Nyquist sampling rate. More specifically, for the random sampling in the row space of $\tilde{H}$ M randomly beamformed OFDM symbols may be used to recover $N_R$>M number of angular positions.

Next, the Kronecker product representation of the matrix equation vec(ABC)=($C^T \otimes A$)B=vec(D) may be used to rewrite the received signal in the measurement phase as:

$$y=((B\Phi)^T \otimes X)\tilde{h}+\tilde{n}$$

Where y=vec(Y) is a (P M)×1 vector obtained from columns-wise stacking sub-carriers Y, $\tilde{h}$=vec($\tilde{H}$) is a ($N_R$D)×1 vector obtained from columns-wise stacking channel matrix $\tilde{H}$, and $\tilde{n}$=vec(Z) is a (P M)×1 vector obtained from columns-wise stacking noise matrix Z.

Estimation of $N_R \times D$ elements of vectorized channel $\tilde{h}$ may be performed using P×M number of received measurements contained in vectorized signal y. Established compressed sensing theory has shown (P×M)≈K log(N_R×D), where K is the sparsity parameter defining the number of non-zero (or, almost zero) elements in vectorized channel h̃. Therefore, pilot signal overhead scales logarithmically with respect to the product of number of receive antennas and the signal bandwidth that dictates the number of channel taps. A beamformed mmWave channel is typically very sparse as signals arrive from a few clusters. Therefore, a huge saving is provided in terms of using pilot resources for acquiring CSI. In addition, for a given number of measurements, a degree of freedom is provided in distributing power across pilot tones.

Sparse signal estimation techniques like least absolute shrinkage and selection operator (LASSO) can be applied to perform the estimation of h̃. For simulation results, a low complexity sparse-reconstruction algorithm has been used based on reduced sub-set least squared followed by zero-attracting least mean absolute deviation.

The compressed measurements y can also be used to infer system parameters like the best analog beamforming vectors or for a given analog beamforming vector the effective analog beamformed channel, which may be used for co-phasing or digital precoding/receive combining. Beam detection and effective channel estimation can be performed as described above.

Simulation Results

TABLE 1

Simulation Parameters

| | |
|---|---|
| ISD | 100 m |
| Carrier Frequency | 73 GHz |
| Bandwidth | 1 GHz |
| BS Transmit power | 40 dBm |
| Cable Loss | 3 dB |
| Channel Model | 3GPP |
| Number of Sub-carriers | 2048 |
| Number of pilot sub-carriers | 128 (At Nyquist rate) |
| Pilot power boosting | None |
| Number of Receive Antennas at UE | 32 |
| Receive Beamformer | Fully analogue using random codebook |
| Number of Transmit Antennas at BS | 256 |
| Transmit Beamformer | Fully digital using SVD precoder |

The random measurement codebook at the receiver contains M measurement codewords. Each codeword is generated by 32 phase shifters when number of receive antennas is 32. Each phase shift is uniformly and independently distributed. Also, P=128 reference symbols are transmitted in frequency domain at the Nyquist sampling rate of the channel in each OFDM symbol. The frequency location of RSs is equally spaced across 1 GHz bandwidth.

The estimated channel power for the center sub-carrier obtained at different angle of arrivals for M=16 measurement codewords and M=32 measurement codewords was used. For performance benchmarking, frequency domain channel estimation method was used as a baseline. The channel is LoS and there is one strongest AoA. The simulation showed that the above sparse channel estimation method quite accurately estimates the strongest angle AoA. Although the baseline method also achieved largest channel power at the correct AoA, baseline method inaccurately estimated relatively higher channel power at multiple angle of arrivals. This affects the overall normalized mean square error (NMSE) performance of per antenna element mmWave channel. More precisely, the NMSE of proposed channel estimation method was at 5.8%, while the baseline had 25% NMSE. Thus, channel estimation may be used to detect an optimal beam from a (large) beamforming codebook that is able to differ from a measurement beamforming codebook used to measure the pilot signals. The estimation algorithm may have parameters that are optimized beforehand using a machine learning or other algorithm and that depend on the measurement beams. Note that the codebooks may be deterministic and designed offline. Such codebooks may be loaded when desired or when a predetermined condition is met, such as after a predetermined time period, or when the propagation environment changes by more than a predetermined threshold (e.g., the SNR/RSRP/RSRQ changes).

Beam tracking in mmWave applications may encounter further problems. Applications that involve channel variations such as those in high-speed autonomous applications, mobile environments etc. may be particularly problematic. This is particularly challenging in hybrid architectures in which the number of RF chains is limited and hence the device does not have full access to all the antenna outputs.

Non-blind beam tracking may use pilot signals that are transmitted to acquire the beam direction. Acquisition of the beam direction using non-blind beam tracking may involve Tx scanning across the beam space and Rx feedback. However, non-blind algorithms incur cost in terms of both bandwidth and time resources and do not track well in high-speed applications. Blind algorithms such as Constant Modulus Algorithms (CMA) rely on the signal profile may instead be used for beam tracking but primarily deal with initial beam access and pilots for continuous tracking. In autonomous applications, while tracking may be used when blockages occur, and vehicles move at high speed (compared to handheld UEs), CMA-based algorithms do not work well for OFDM signals that have high peak-to-average power ratio (PAPR). Further, CMA-based algorithms incur larger costs in the case of hybrid beamforming in which access to the signal is only available after beamforming rather than having access to all outputs of the antennas.

A blind beam tracking technology is presented for use by, among others, hybrid architectures. Specifically, a blind angle locked loop (ALL) algorithm is described for beam tracking using hybrid architectures. The ALL algorithm assumes that at least one other RF chain (in addition to the main beam chain) is available for tracking. By determining the energy change in the direction of the beam between the addition RF chain and the main beam chain, the main beam may be adapted to track any changes in the signal. This avoids the use of pilots or can be used for tracking in between the time arrivals of the pilots and is effective in low SNR conditions. Moreover, timing synchronization and FFT processing may be avoided as the ALL algorithm is a time domain algorithm. In addition, the ALL algorithm is able to track from time sample to time sample, the adaption consequently occurs with every time sample. Note that it is assumed that the initial beam direction is acquired and this technique used to track the beam when there is relative motion between the Tx and Rx.

Figure 10:
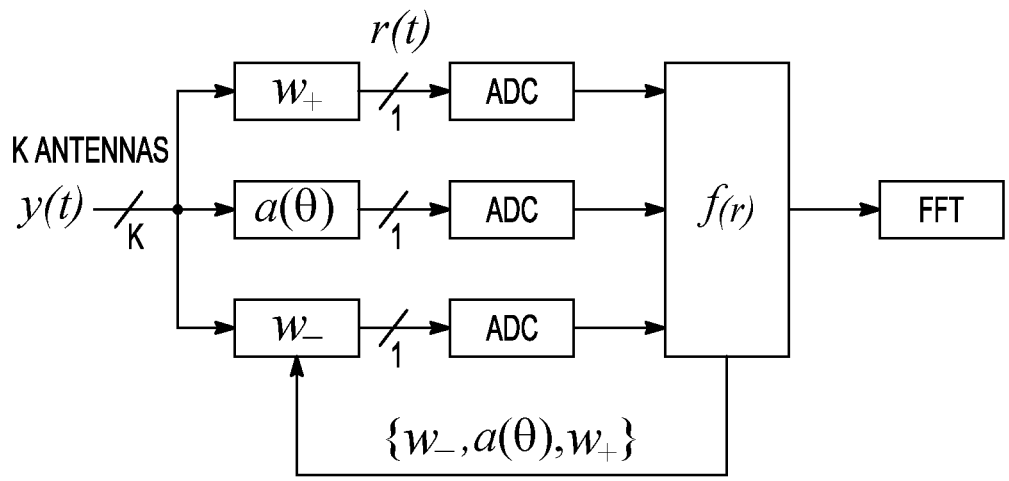
FIG. 10 illustrates a block diagram for hybrid Radio Frequency (RF) beamforming in accordance with some aspects.

FIG. 10 illustrates a block diagram for hybrid Radio Frequency (RF) beamforming in accordance with some aspects. In the following equations, a flat fading channel to begin with is assumed.

$$y_k(t) = h_k x(t) + n(t)$$

where $y_k(t)$ is the signal received at the k-th antenna (Nr in FIGS. 3 and 4), $h_k$ is the channel response of the kth channel on which the desired signal (x(t)) is transmitted and n(t) is the noise on the channel. In vector form this can be written as:

$$y(t) = hx(t) + n(t)$$

$$h = \sum_m g_m a(\theta_m)$$

$$a(\theta) = [1 \; e^{j\pi \sin(\theta)} \; \wedge \; e^{j(K-1)\pi \sin(\theta)}]^T$$

where $a(\theta)$ is a scaling vector and $g_m$ is the complex channel gain assuming that the initial beam is obtained through pilots or other beam access procedures such as sector sweep.

$$\theta = \max_{\theta} |a^H(\theta)h|^2$$

For tracking, two other RF chains may be used:

$$W = [w\_a(\theta)w_+]$$

The digital signal at the output of these RF chains is given by:

$$r(t) = W^H y(t)$$

The weight matrix W and the AoA change detector $f(r)$ may be desired to detect the direction of the beam change:

$$\theta = \theta + \mu f(r)$$

where $\mu$ is the update factor, which may be dependent on noise and speed (for example, for faster tracking $\mu$ is larger, for a noisy environment $\mu$ is smaller). The weight vectors and update algorithm may be designed as follows:

$$w_- = a(\theta - \delta), w_+ = a(\theta + \delta)$$

where $\delta$ are the tracking angles. The change detector function is:

$$f(r) = \text{sign}(|r_3(t)| - |r_1(t)|)$$

where $r_3$ and $r_1$ are the digital signals associated with $w_+$ and $w_-$, respectively. The beam angle is then tracked in a closed loop manner using the update equation:

$$\theta = \theta + \mu f(r)$$

Using the above blind ALL algorithm permits tracking under both high (20 dB) and low (−10 dB) SNR conditions. Simulations performed using 8 antennas with an FFT size of 2048 show tracking within about 1° for high SNR with a 0.1° AoA sample step over 2500 samples and within about 2° for low SNR with a 0.01° AoA sample step over 2500 samples.

As above, a beamforming network may be used to provide the above beam tracking. As described above, the beamforming network may be controlled in some aspects using UTM information stored in the BS. However, UTM information can be intentionally corrupted. For example, malicious drones can incorrectly report their positions, causing performance degradations and posing security risks. Incorrect position estimates can moreover cause instability issues.

To provide interference mitigation, security and location precision without any communication overhead or increased hardware complexity, a technique is provided that extracts maximal information from observed signals without the use of RSs. To accomplish this, let $y_k(t)$ be the received signal at antenna k, at time t in a drone with multiple antennas. This can be represented as follows:

$$y_k(t) = h_k^H s(t) + n$$

where, as above, $h_k$ is the channel response, s(t) is the source signal at time t and n is noise. Note that this is a vector since multiple sources could be active at any time. Depending on the problem being solved, these sources could be different entities. In the communication case, s is the set of desired sources and the interfering sources. In the case of location estimation, s could be any arbitrary signal transmitted from a node when the AoA from that node is of interest or could be RS from a GPS or ranging transmitter if the AoA and time of arrival of the signal from this source is of interest. For the below, no assumptions of pilots or knowledge of RSs were made. The different problems of interest in the drone scenario are described and the above equation modified suitably to match to the corresponding scenario and the corresponding algorithms showcased.

For interference mitigation, the open sky environment for drone poses serious interference challenges due to the environment having limited obstruction and thus free-space propagation. Thus, a drone may see multiple interfering signals in addition to its desired signal of interest. One objective is to mitigate the power of the interfering signals. Let N be the number of antennas at the desired drone, $M_D$ the number of desired signal streams and $M_I$ the number of interfering signal streams. Equation (1) can be written as follows:

$$Y_{N \times T} = HS_{(M_D + M_I) \times T} + n$$

where Y is the observed signal stream from the N antennas for a time duration T, H is the channel matrix that is assumed to be unknown and S is the set of all received signal streams given as follows:

$$S = \begin{pmatrix} S_D \\ S_I \end{pmatrix}$$

where $S_D$ of size $M_D \times T$ is the desired stream and $S_I$ of size $M_I \times T$ the interfering stream. The weight vectors $W = w_1 \ldots w_{M_D}$ are determined such that:

$$w_i^H Y \approx \alpha_i S_D^i + \text{noise}, i = 1, \ldots, M_D$$

Figure 11:
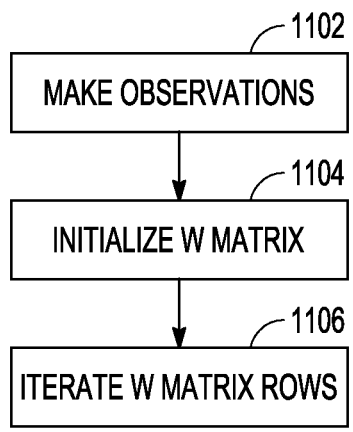
FIG. 11 illustrates a non-Gaussian optimization method in accordance with some aspects.

Each of the sources is assumed to be non-Gaussian. The algorithm could be applied in any dimension where the sources are likely more non-Gaussian. For example in the FFT domain for OFDM-like signals. However, the sum of a set of non-Gaussian variables is more Gaussian than each of the individual variables. Hence, by maximizing a measure of non-Gaussianity, the individual sources may be able to be extracted. To that extent, the following optimization problem is solved to extract the sources of interest:

$$w_{opt} = \arg \max E\{|G(w^H Y)|^2\}$$

where E is the expectation value and G is the non-Gaussian measure (e.g., $4^{th}$ order or entropy cumulative). FIG. 11 illustrates a non-Gaussian optimization method in accordance with some aspects. The algorithm shown in FIG. 11 describes a block method to solve this optimization problem (assume the input data is whitened): first, observations are made at operation 1102: $Y_{N \times T} = HS_{N \times T} + n$. Next, at operation 1104 the W matrix is initialized W=I. Then, iteration is performed for each row at operation 1106 $w_i \in W$ until convergence. The iteration includes solving:

$$w_i^{j+1} = -E\{G^*(z)G^*(z)Y\} + E\{G'(z)G^*(z)\}w_i^j + E(yy^T)$$
$$E\{G^*(z)G''(z)\}w_i^{j*}$$

for each row and then orthonormalizing the rows to get a unitary W.

For drones, this can be further optimized based on a partial knowledge of who the interferers are. Since the propagation environment is largely LOS and the drone uses a linear antenna array, then the channel matrix can be represented by an array matrix. Let the scaling vector a(θ):

$$a(\theta)=[1 e^{j\alpha\,sin(\theta)} \ldots e^{j(N-1)\,\alpha\,sin(\theta)}]$$

At each location in space, a database can be built with potential interferers that can be updated with multiple drones traversing that area. If the interferers are the static BSs, since the position of the BSs are fixed, and the drone location is fixed an estimate of the angles from the BSs can be obtained. The channel matrix thus roughly has the following form:

$$H(\{a(\theta_k)\}) \approx [g_1 a(\theta_1) g_a a(\theta_2) \ldots g_{M_D M_1} a(\theta_{M_F+M_1})]$$

where $g_i$ is a complex scaling factor. The above interference mitigation algorithm is an iterative solution to a non-convex optimization problem and hence can benefit from a good initial point. This initial point can be made a function of the known interfering source array vectors:

$$W^0 = f(\{a(\theta_k)\})$$

An example of such a function could be:

$$W^0 = H(\{a(\theta_k)\})^{-1}$$

Figure 12:
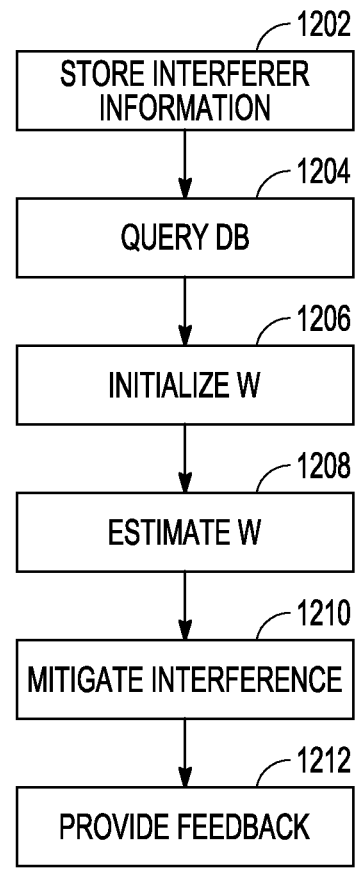
FIG. 12 illustrates another non-Gaussian optimization method in accordance with some aspects.

Once the above algorithm has been executed, the drone also has an estimate of the interfering directions which could be sent back to the network to update the database. In some aspects, the network may store the weight vectors W as a function of the location in a database and a drone in the future can use these weights as the initial point for the iterative algorithm. FIG. 12 illustrates another non-Gaussian optimization method in accordance with some aspects in which the weights are stored. Thus, as shown in FIG. 12, the network may maintain interferer information in a database at operation 1202. The interferer information may include interferer locations $l_i$ and the interferer angles $\{\theta_k(l_i)\}$ and/or the weight vectors $W^t(l_i)$ at time t. The drone may query the database at operation 1204 for the most recently stored angles and the weight vectors. At operation 1206, the drone may use the information obtained from the database to initialize the weight vector $W^0 = \text{func}(W^t(W^t(l_i), \{\theta_k(l_i)\}))$. The drone may then at operation 1208 execute the algorithm shown in FIG. 11 to estimate W. At operation 1210, the drone may use the estimated W to mitigate the interference. After mitigating the interference from the interferers, the drone may at operation 1212 feed back W to the network to update the database for the next time increment.

In addition to mitigating interference, the drone may also estimate the AoA for localization and security authentication. Assuming that there is a single drone that is transmitting, and that the signal is received by neighboring drones and base stations, the signal received at any particular base station/drone can be written as follows:

$$y_k(t) = h_k s(t) + n$$

Assuming a LOS channel and a linear array, $$h_k = \beta e^{j\alpha(k-1)sin(\theta)}$$

where θ is the AoA at the destination node. Here β captures any phase calibration and channel phase that is introduced. When $$w_k = e^{j\alpha(k-1)sin(\hat{\theta})}$$

θ may be estimated, and $\hat{\theta}$ here is the estimate of the AoA. Let $$r(t) = \Sigma_k w_k^* y_k(t).$$

It can be seen that, when the AoA estimate is equal to the true AoA, then the power of the resulting signal r(t) is maximized. Therefore, the following optimization problem may be solved to solve for the angles.

$$\max_{\hat{\theta}} E(|r(t)|^2)$$

Figure 13:
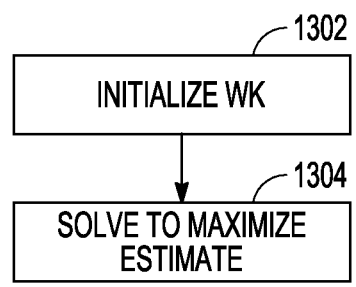
FIG. 13 illustrates an Angle of Arrival (AoA) optimization method in accordance with some aspects.

This problem can be solved as shown in FIG. 13. FIG. 13 illustrates an Angle of Arrival (AoA) optimization method in accordance with some aspects. Let $\phi_k = \angle w_k$. Then, as shown in FIG. 13, at operation 1302, $w_k$ is initialized (initially set to zero). At operation 1304, $$\max_{\hat{\theta}} E(|r(t)|^2)$$

is then solved using the following updates:

$$\phi_k = \phi_k + \mu L\{z_k(t) r(t)\}$$

$$\hat{\theta} = \frac{1}{N-1} \sum a\sin\frac{\phi_k}{\alpha(k-1)}$$

$$\phi_k = \alpha(k-1)\sin(\hat{\theta})$$

Figure 14:
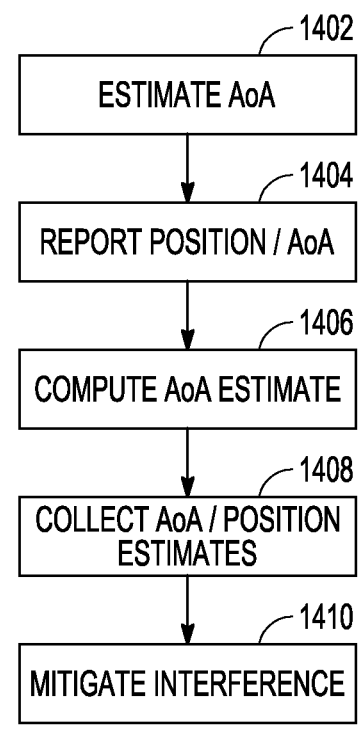
FIG. 14 illustrates an interference mitigation method in accordance with some aspects.

Thus, the AoA arrival can be blindly determined at the neighboring drones and the base stations. This may be used to estimate the position of the transmitting drone. This provides for an independent location estimate of the target drone that can be used to authenticate its location for security purposes and determine whether the drone is not intruding any restricted airspaces. FIG. 14 illustrates an interference mitigation method in accordance with some aspects. To determine the position of a target drone, at operation 1402, each drone in the vicinity of the target drone may estimate the AoA of the target drone based on the observed signals from the target drone. In some aspects, only drones that have received an observed signal from the target drone having a signal quality (e.g., SNR, RSRP, RSRQ) above a predetermined threshold may estimate the AoA. At operation 1404, each drone may report its own position and the estimated AoA of the target drone to the serving BS. At operation 1406, other BSs may also compute their AoA estimates with respect to the target drone. At operation 1408, the network may collect the AoA estimates and position estimates of the neighboring drones and also that of the BSs. The network may at operation 1410 analyze the positions and the AoA estimates collected to estimate the position of the target drone independent of the position the target drone reports. The independently estimated position can also be reported back to the drone to improve its position estimate and, in some aspects, may not provide a report if the position estimated by the target drone and the independently estimated position are within a predetermined tolerance. This can also be used for security authentication purposes to verify that a drone is not maliciously reporting incorrect positions. In the latter case, the network may make such a determination based on the difference between the position reported by the drone and that independently determined exceeding a predetermined threshold difference (e.g., 1 m or 10 m). If the threshold is exceeded, the network may report the drone to a monitoring agency, such as a nearby police station and/or ignore transmissions from/to the drone.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a drone, the apparatus comprising:
   processing circuitry arranged to:
   determine a position of the drone from reference signals received from a base station via beamforming;
   generate a measurement report to the base station, the measurement report indicating height information of the drone;
   decode higher layer signaling, from the base station, that contains a synchronization signal block (SSB) restriction pattern, the SSB restriction pattern dependent on a height of the drone such that the SSB restriction pattern when the height of the drone is above a predetermined threshold is different from the SSB restriction pattern when the height of the drone is below the predetermined threshold; and
   for communications below 6 GHz, restrict search for and measurement of primary synchronization signals (PSSs) and secondary synchronization signals (SSSS) to restricted synchronization signal blocks (SSBs) indicated by the SSB restriction pattern; and
   a memory configured to store the SSB restriction pattern.

2. The apparatus of claim 1, wherein the processing circuitry is further arranged to:
   decode the higher layer signaling when in a radio resource control (RRC) connected mode to change SSB restriction patterns, the higher layer signaling being RRC signaling for static signaling and RRC signaling and Medium Access Control (MAC) Control Element (CE) signaling for semi-static signaling.

3. The apparatus of claim 2, wherein at least one of:
   the SSB restriction pattern received is dependent on the height information transmitted,
   the change in SSB restriction patterns is dependent on Unmanned Traffic Management (UTM) stored at the base station, or
   the change in SSB restriction patterns indicates deactivation of upper vertical SS beams when the drone is below the base station.

4. The apparatus of claim 1, wherein:
   the SSB restriction pattern comprises a bitmap that indicates a number of SS beams to use in a vertical dimension, the bitmap configured to limit available SS beams to a subset of the available SS beams, each SS beam containing the PSSs and SSSs, and
   the bitmap further indicates a number of SS beams to use in a horizontal dimension, the bitmap having a length of a product of the number of SS beams in the vertical dimension times the number of SS beams to use in the horizontal dimension.

5. The apparatus of claim 1, wherein the processing circuitry is further arranged to:
   decode, from the base station, other higher layer signaling that indicates an unused SSB among available SSBs, the unused SSB dependent on positions of all user equipment served by the base station and SSB restriction patterns of the user equipment.

6. The apparatus of claim 1, wherein:
   a number of available SSBs in a vertical dimension is larger than 4 when the communications are below 3 GHz and larger than 8 when the communications are between 3 GHz and 6 GHz.

7. The apparatus of claim 1, wherein the processing circuitry is further arranged to:
   engage in beamforming using a digital beamforming architecture, the digital beamforming architecture comprising:
   an analog-to-digital converter (ADC) that digitizes $N_r$ analog signals received from a plurality of antennas,
   a plurality of synchronization signal (SS) detectors that determine coarse timing and fractional frequency offset (FFO) of SUR beamformed signals,
   a beamforming network disposed between the ADC and the SS detectors, the beamforming network supplied with a $N_r$ dimension data sample vector to produce the $N_{RF}$ beamformed signals, the SS detectors configured to detect $N_{SS}$ cells from the $N_{RF}$ beamformed signals,
   a plurality of fast Fourier transforms (FFTs) to which outputs of the SS detectors are provided,
   fine timing and integer frequency offset (IFO) to determine fine timing and frequency offset synchronization of neighboring cells, and
   measurement circuitry to measure at least one of Reference Signal Received Power (RSRP) or Reference Signal Received Quality (RSRQ) of a cell reference signal (CRS) of each of the neighboring cells.

8. The apparatus of claim 7, wherein the digital beamforming architecture further comprises at least one of:
   an FFT, demodulator and decoder configured to detect, demodulate and decode a Physical Downlink Control Channel and a Physical Downlink Shared Channel of the base station simultaneously with measurement of the at least one of the RSRP or RSRQ of the CRSs of the neighboring cells, or
   a controller disposed between the SS detectors and the FFTs and configured to provide feedback to the beamforming network to adjust a beam direction to a neighboring cell having a stronger SS signal than that of a current cell.

9. The apparatus of claim 8, wherein the processing circuitry is further arranged to:
control the controller based on Unmanned Traffic Management (UTM) information received from the base station.

10. The apparatus of claim 1, wherein the processing circuitry is further arranged to:
engage in beamforming using a hybrid beamforming architecture, the hybrid beamforming architecture comprising:
an analog front end (AFE) to which signals from a plurality of antennas is supplied,
an analog-to-digital converter (ADC) that digitizes analog signals,
a beamforming network disposed between the AFE and the ADC, the beamforming network supplied with $N_r$ analog signals to produce $N_{RF}$ beamformed signals,
coarse timing and fractional frequency offset (FFO) circuitry configured to determine coarse timing and a FFO of the $N_{RF}$ beamformed signals,
a plurality of fast Fourier transforms (FFTs) configured to receive a beam controlled output of the coarse timing and FFO circuitry,
a controller disposed between the coarse timing and FFO circuitry and the FFTs and configured to provide feedback to the beamforming network to adjust a beam direction to a neighboring cell having a stronger signals than that of a current cell, and
fine timing and integer frequency offset (IFO) configured to receive an output of the FFTs and to determine fine timing and frequency offset synchronization of neighboring cells.

11. The apparatus of claim 1, wherein the processing circuitry is further arranged to, for communications above 6 GHz:
determine a reference signal sub-carrier group assigned to the base station, the reference signal sub-carrier group having P frequency locations uniformly spaced across an entire bandwidth used by the base station,
use M random beamformers on M orthogonal frequency-division multiplexing (OFDM) symbols received on M different measurement beams by $N_r$ antenna elements, each random beamformer being a $N_r \times 1$ vector of independent random phases generated using $N_r$ phase shifters, where $M<N_r$,
perform channel sounding on the M OFDM symbols using a different beamformer for each OFDM symbol, where each OFDM symbol is N samples long with inter sub-carrier frequency δf bandwidth of N δf, and
perform channel estimation using M×P samples of the M OFDM symbols and detect an optimal beam, of the measurement beams, from a beamforming codebook that is able to differ from a measurement beamforming codebook used to measure pilot signals.

12. The apparatus of claim 11, wherein at least one of:
the channel sounding is performed on consecutive OFDM symbols,
the channel sounding is performed using an estimation algorithm with parameters that are optimized beforehand using a machine learning algorithm and possibly on the measurement beams,
the $N_r$ phase shifters are circularly symmetric complex Gaussian vectors,
a receive measurement codebook used for beam selection and channel estimation is based on weighted pseudo random beamforming with adaptive weight updates, the weight updates provided by the base station and adaptive to channel conditions of the sub-carrier group of the base station, or
at least one of a beamforming cookbook or the receive measurement codebook is deterministic, designed offline and is loaded when a predetermined condition is met.

13. The apparatus of claim 11, wherein:
a channel tap matrix $\tilde{H}$ of $N_r$ symbols is sparse in row and column space, and
the processing circuitry further configured to perform random sampling along a row space of $\tilde{H}$ at a sub-Nyquist sampling rate using M randomly beamformed OFDM symbols to recover $N_r>M$ number of angular positions.

14. The apparatus of claim 13, wherein:
a mm-wave channel for communication between the drone and the base station is given by $h_i[k]=H_i[k]w_i$, which is a $N_R \times 1$ vector channel on sub-carrier k, and $w_i$ an optimal transmit beamformer $w_i \in \mathbb{C}^{N_T \times 1}$,
a received signal in an $i_k$-th sub-carrier of an m-th OFDM symbol of the OFDM symbols is given by:

$$y_m[i_k]=\varphi_m^H(h_i[i_k]X_{i_k}+n_m[i_k]), k=0,\ldots,P-1$$

where $\varphi_m^H$ is one of the random beamformers and $n_m$ is noise,
the processing circuitry further configured to use a Kronecker product representation of a matrix equation $vec(ABC)=(C^T \otimes A)B=vec(D)$ to rewrite the received signal in a measurement phase as:

$$y=((B\Phi)^T \otimes X)\tilde{h}+\tilde{n}$$

where:
$y=vec(Y)$ is a (P M)×1 vector obtained from columns-wise stacking of sub-carriers Y,
$\tilde{h}=vec(\tilde{H})$ is a $(N_r D) \times 1$ vector obtained from columns-wise stacking of channel matrix $\tilde{H}$, and
$\tilde{n}=vec(Z)$ is a (P M)×1 vector obtained from columns-wise stacking of noise matrix Z, and
perform an estimation of $N_r \times D$ elements of vectorized channel $\tilde{h}$ using P×M number of received measurements contained in vectorized signal y, using a sparse signal estimation technique.

15. The apparatus of claim 14, wherein:
the sparse signal estimation technique is based on a reduced sub-set least squared followed by zero-attracting least mean absolute deviation.

16. The apparatus of claim 1, wherein the processing circuitry further configured to:
beamform using a blind angle locked loop algorithm for beam tracking free from using pilot signals from the base station after an initial synchronization,
the beam tracking uses multiple radio frequency (RF) chains comprising a main RF chain associated with a beam direction of an angle of arrival (AoA) and adjacent RF chains associated with predetermined angles from the beam direction, and
the beam tracking employs feedback from the adjacent RF chains to determine whether to adjust the beamforming.

17. The apparatus of claim 16, wherein:
a signal received from the base station at $N_r$ antennas is given in vector form as:

$$y(t)=hx(t)+n(t)$$

where y(t) is the signal received, n(t) is noise, and $$h = \sum_m g_m a(\theta_m)$$

$$a(\theta) = [1 \ e^{j\pi \sin(\theta)} \ \ldots \ e^{j(K-1)\pi \sin(\theta)}]^T$$

where $g_m$ is a complex channel gain, $$\theta = \max_\theta |a^H(\theta)h|^2$$
$$W = [w_- \ a(\theta) \ w_+]$$
$$w_- = a(\theta - \delta), w_+ = a(\theta + \delta)$$

where W is a weight matrix and w+ and w− weight vectors, a digital signal at an output of the main and adjacent RE chains is given by:

$$r(t) = W^H y(t)$$

$$\theta = \theta + \mu f(r)$$

$$f(r) = \text{sign}(|r_3(t)| - |r_1(t)|)$$

where f(r) is an AoA change detector that is able to detect a direction of a change in AoA and μ, is an update factor.

18. The apparatus of claim 17, wherein: μ is dependent on a magnitude of noise and a relative speed of the drone.

19. The apparatus of claim 1, wherein the processing circuitry further configured to:
maximize a measure of non-Gaussianity by optimizing weight vectors:

$$w_{opt} = \arg \max E\{|G(w^H Y)|^2\}$$

over a predetermined set of observations of an observed signal stream, where:

$$Y_{N \times T} = HS_{N \times T} + n$$

in which Y is the observed signal stream, H is a channel matrix, S is a set of all received signal streams, including both desired signal streams and interfering signal streams, n is noise, and E{x} is expectation of x,
after initialization of a weight matrix W containing the weight vectors, by
iterating, for each row $w_i \in W$, until convergence:

$$w_i^{j+1} = -E\{G^*(z)G^*(z)Y\} + E\{G'(z)G'^*(z)\}w_i^j + E(yy^T) \\ E\{G^*(z)G''(z)\}w_i^{j^*}$$

and orthonormalizing the rows to get a unitary W.

20. The apparatus of claim 19, wherein:
the measure of non-Gaussianity is a fourth order cumulative, an entropy function or mutual information.

21. The apparatus of claim 19, wherein the processing circuitry further configured to:
decode locations $l_i$, interferer angles $\{\theta_k(l_i)\}$ and weight vectors $W'(l_i)$ from a network database in a network containing the base station,
initialize a weight vector $W^0 = \text{func}(W'(W'(l_i), \{\theta_k(l_i)\}))$,
perform the maximization of the measure of non-Gaussianity to estimate W,
mitigate interference from interferers in the network, and
generate an update to the network database based on W.

22. A non-transitory computer-readable storage medium that stores instructions for execution by one or more processors of a user equipment (UE), the one or more processors to configure the UE to, when the instructions are executed:
determine a position of the UE from reference signals received base station via beamforming;
transmit a measurement report to the base station, the measurement report indicating height information of the UE;
receive, from the base station, higher layer signaling that contains a synchronization signal block (SSB) restriction pattern, the SSB restriction pattern dependent on a height of the UE such that the SSB restriction pattern when the height of the UE is above a predetermined threshold is different from the SSB restriction pattern when the height of the UE is below the predetermined threshold; and
for communications below 6 GHz, restrict search for and measurement of primary synchronization signals (PSSs) and secondary synchronization signals (SSSs) to restricted synchronization signal blocks (SSBs) indicated by the SSB restriction pattern; and
receive Medium Access Control (MAC) Control Element (CE) signaling to change SSB restriction patterns,
wherein a number of available SSBs in a vertical dimension is larger than 4 when the communications are below 3 GHz and larger than 8 when the communications are between 3 GHz and 6 GHz.

23. The medium of claim 22, wherein:
the change in SSB restriction patterns is dependent on Unmanned Traffic Management (UTM) stored at the base station, and
the change in SSB restriction patterns indicates deactivation of upper vertical SS beams when the UE is below the base station.

24. A method of estimating angle of arrival (AoA) for a target drone, the method comprising:
receiving an estimated AoA and position from the target drone;
receiving an estimated AoA and position from each neighboring drone of the target drone, the AoA based on observed signals from the target drone, the observed signals having at least one of Reference Signal Received Power (RSRP) or Reference Signal Received Quality (RSRQ) greater than a predetermined threshold;
collecting AoA estimates from multiple base stations with respect to the target drone; and
estimating a target drone position based on the positions and the AoA estimates of the multiple base stations and neighboring drones;
comparing the target drone position and the position from the target drone; and
taking a network action based on a comparison between the target drone position and the position from the target drone.

25. The method of claim 24, wherein the network action comprises at least one of:
reporting the target drone position to the target drone, or determining that the drone is deliberately reporting incorrect positions based on a difference between the target drone position and the position from the target drone exceeding a predetermined threshold.

* * * * *